(12) United States Patent
Baxter et al.

(10) Patent No.: US 12,480,764 B2
(45) Date of Patent: Nov. 25, 2025

(54) ADJUSTABLE ANGLE POCKET LEVEL

(71) Applicant: Apex Brands, Inc., Apex, NC (US)

(72) Inventors: Adam Baxter, Raleigh, NC (US);
Sujith Sunny, Huntersville, NC (US);
Bryan Washburn, Charlotte, NC (US);
Anthony Katsaros, Durham, NC (US)

(73) Assignee: Apex Brands, Inc., Apex, NC (US)

( * ) Notice: Subject to any disclaimer, the term of this patent is extended or adjusted under 35 U.S.C. 154(b) by 373 days.

(21) Appl. No.: 18/020,729

(22) PCT Filed: Aug. 18, 2021

(86) PCT No.: PCT/US2021/046430
§ 371 (c)(1),
(2) Date: Feb. 10, 2023

(87) PCT Pub. No.: WO2022/040264
PCT Pub. Date: Feb. 24, 2022

(65) Prior Publication Data
US 2023/0332889 A1    Oct. 19, 2023

Related U.S. Application Data

(60) Provisional application No. 63/067,039, filed on Aug. 18, 2020.

(51) Int. Cl.
G01C 9/26    (2006.01)
(52) U.S. Cl.
CPC ..................... G01C 9/26 (2013.01)
(58) Field of Classification Search
CPC ............... G01C 9/26; G01C 9/28; G01C 9/34
USPC ................. 33/365, 379, 382, 383, 384, 385
See application file for complete search history.

(56) References Cited

U.S. PATENT DOCUMENTS

| 250,777 A | 12/1881 | Bergh | |
| 2,797,486 A * | 7/1957 | Vaara | G01C 9/26 33/332 |
| 3,797,125 A * | 3/1974 | Yetter | G01C 9/34 33/387 |

(Continued)

FOREIGN PATENT DOCUMENTS

CN    209745274 U    12/2019

OTHER PUBLICATIONS

International Search Report and Written Opinion from International Application No. PCT/US2021/046430 mailed Nov. 24, 2021, all enclosed pages cited.

Primary Examiner — George B Bennett
(74) Attorney, Agent, or Firm — Burr & Forman

(57) ABSTRACT

A measuring device may include a housing having a front wall and a rear wall operably coupled to each other via a base portion and defining a receiving space between the front wall and the rear wall, a rotatable vial holder disposed in the receiving space and being configured to hold a vial, and a locking assembly having a locked state in which the rotatable vial holder is prevented from rotating relative to the housing. The locking assembly is also configured to enable the rotatable vial holder to be rotated relative to the housing when the locking assembly is in an unlocked state. The rotatable vial holder may be rotatable to a deployed position to define a selected angle between the base portion and the vial, and rotatable to a storage position in which the vial is enclosed inside the receiving space of the housing.

18 Claims, 12 Drawing Sheets

(56) References Cited

U.S. PATENT DOCUMENTS

| | | | | |
|---|---|---|---|---|
| 3,894,342 | A * | 7/1975 | Goode | G01C 9/28 33/388 |
| 4,073,062 | A * | 2/1978 | Wright | G01C 9/28 33/388 |
| 4,144,650 | A * | 3/1979 | Rawlings | G01B 3/56 33/451 |
| 4,394,801 | A * | 7/1983 | Thibodeaux | B25H 7/00 33/496 |
| 4,922,621 | A * | 5/1990 | Maier | B43L 7/12 33/465 |
| 5,239,761 | A * | 8/1993 | Wu | G01C 9/28 33/399 |
| 5,337,489 | A | 8/1994 | Mustafa | |
| 5,531,031 | A * | 7/1996 | Green | G01C 15/008 33/286 |
| 5,675,901 | A | 10/1997 | Young | |
| 5,839,200 | A * | 11/1998 | Decesare | G01C 9/28 33/381 |
| 6,134,795 | A * | 10/2000 | Hitchcock | G01C 9/26 33/465 |
| 6,209,213 | B1 | 4/2001 | Moe | |
| 6,543,144 | B1 * | 4/2003 | Morin | G01B 3/56 33/473 |
| 6,954,990 | B2 * | 10/2005 | Ellis | G01B 3/563 33/471 |
| 7,171,755 | B1 * | 2/2007 | Arent | A47G 1/16 33/194 |
| 7,685,722 | B1 * | 3/2010 | Spire, Jr. | G01C 21/02 33/270 |
| 8,443,814 | B2 * | 5/2013 | Regalado | A45D 24/36 132/148 |
| 9,851,203 | B2 * | 12/2017 | Heerschap | G01C 17/16 |
| 9,885,571 | B2 * | 2/2018 | Hoppe | G01C 9/34 |
| 2004/0172841 | A1 | 9/2004 | Larsson | |
| 2004/0216316 | A1 * | 11/2004 | Ellis | G01B 3/563 33/471 |
| 2009/0064516 | A1 * | 3/2009 | Diaz | G01C 9/26 33/471 |
| 2009/0229136 | A1 * | 9/2009 | Howard | G01C 9/26 33/301 |
| 2011/0119940 | A1 * | 5/2011 | Zerhusen | G01C 9/10 33/365 |
| 2016/0047650 | A1 * | 2/2016 | Butler | B43L 7/0275 33/381 |
| 2023/0314132 | A1 * | 10/2023 | Wang | G01C 9/34 33/354 |
| 2024/0310170 | A1 * | 9/2024 | Palatshe | G01C 9/34 |

* cited by examiner

ADJUSTABLE ANGLE POCKET LEVEL

TECHNICAL FIELD

Example embodiments generally relate to angle measuring devices, and particularly relate to a spirit or bubble level that is adjustable.

BACKGROUND

Measuring devices such as bubble levels (or spirit levels) have been around for a very long time, and are common measuring tools used in numerous contexts to obtain angular measurements or to ensure that surfaces are level or plumb. Most commonly, the bubble level is provided in a tubular vial, and the vial is attached to a flat surface so that when the bubble is in the center of the vial, the surface (which may be laid on another surface being measured for level or plumb) is known to be level. The attachment between the tubular vial and the flat surface is typically a fixed attachment. Level and plumb may be measured by the same device with multiple vials provided with different angles (e.g., 90 degree rotation) relative to perpendicular flat surfaces.

To allow using a single vial to measure surfaces at different angles (including variable angles), some devices have been produced that effectively provide a platform for rotating the vial within the level device itself. However, these devices are often difficult to accurately set at any given angle, so it is difficult to place confidence in any angle that is set. Slipping of settings can also happen either with under-tightening, or the tightening capability may be compromised over time by over-tightening. Moreover, the tendency to over-tighten such devices may cause them to wear out quickly and become inaccurate over time. Additionally, the vial is generally exposed to damage since the vials are freely accessible or even slightly protruding in all or many of the angles to which the vials may be rotated.

Accordingly, it may be desirable to improve device designs in order to provide a more flexible and useful structure, which can be very attractive to consumers, but also robust.

BRIEF SUMMARY OF SOME EXAMPLES

Some example embodiments may enable the provision of a measuring device (e.g., a bubble level). The device may include a housing having a front wall and a rear wall operably coupled to each other via a base portion and defining a receiving space between the front wall and the rear wall, a rotatable vial holder disposed in the receiving space and being configured to hold a vial, and a locking assembly having a locked state in which the rotatable vial holder is prevented from rotating relative to the housing. The locking assembly is also configured to enable the rotatable vial holder to be rotated relative to the housing when the locking assembly is in an unlocked state. The rotatable vial holder may be rotatable to a deployed position to define a selected angle between the base portion and the vial, and rotatable to a storage position in which the vial is enclosed inside the receiving space of the housing.

In an example embodiment, an alternative measuring device may be provided. The measuring device may include a housing having a front wall and a rear wall operably coupled to each other via a base portion and defining a receiving space between the front wall and the rear wall, a rotatable vial holder disposed in the receiving space and being configured to hold a vial, and a locking assembly having a locked state in which the rotatable vial holder is prevented from rotating relative to the housing. The locking assembly is also configured to enable the rotatable vial holder to be rotated relative to the housing when the locking assembly is in an unlocked state. The device may further include a position retaining assembly configured to define a plurality of selected angles between the base portion and the vial that correspond to segments of a first scale. The position retaining assembly may be configured to provide audible and/or haptic feedback to indicate alignment of the rotatable vial holder and the housing at each respective one of the selected angles.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 10:
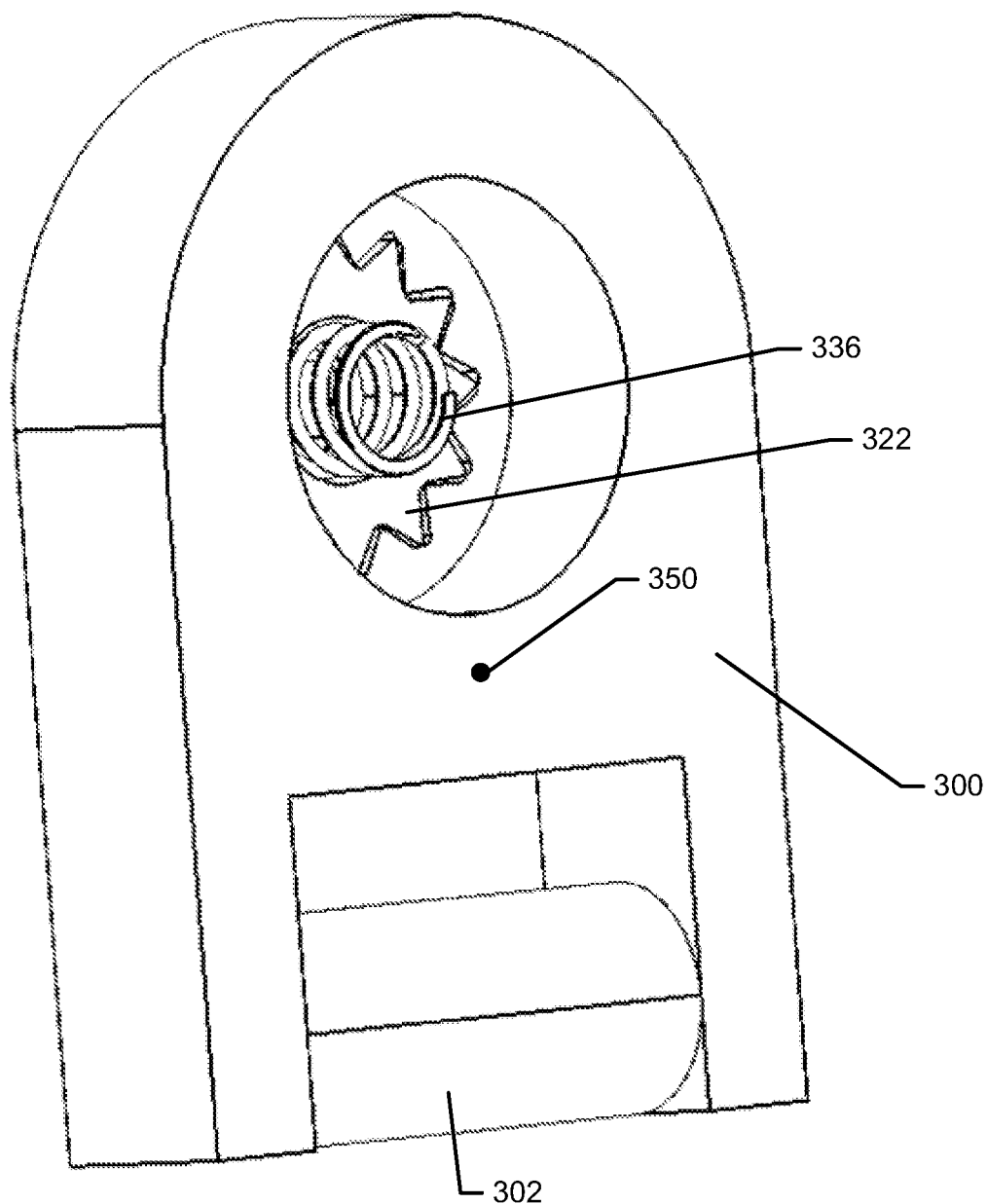
FIG. 10 shows a protrusion on a portion of the rotatable vial holder in accordance with an example embodiment.
Figure 11:
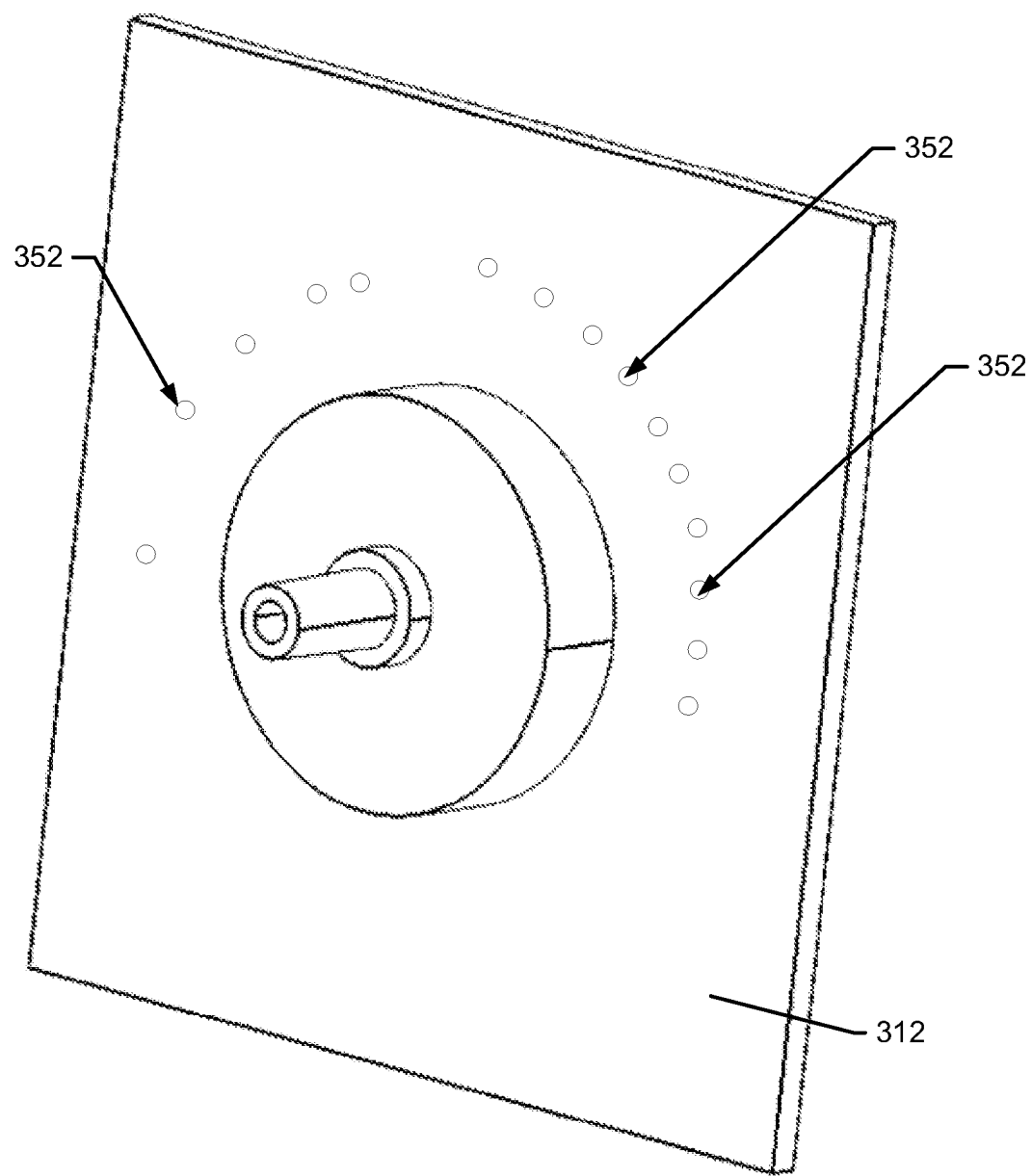
Figure 12A:
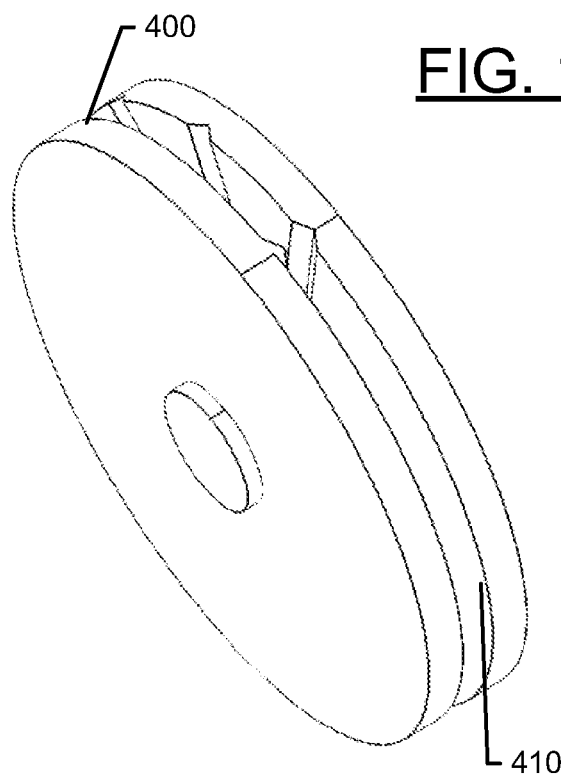
Figure 12B:
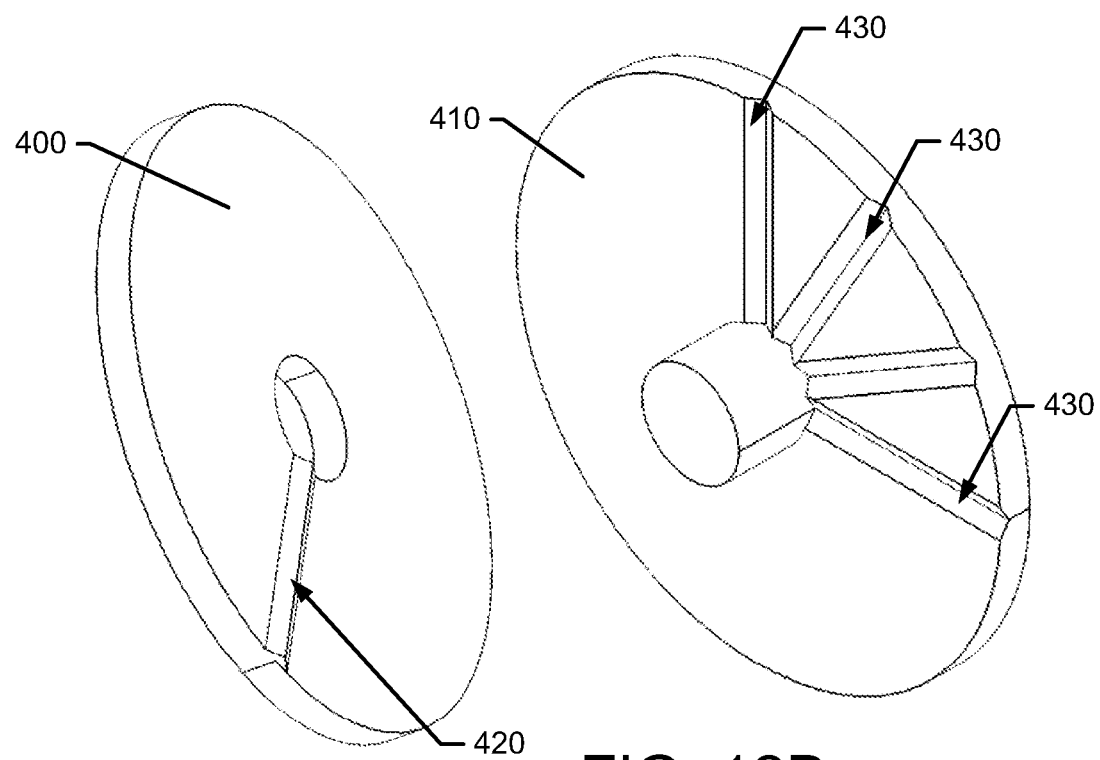

FIG. 11 illustrates recesses on a rear wall of the housing and configured to interface with the protrusion of FIG. 10 in order to provide haptic and/or audible feedback during rotation of the rotatable vial holder in accordance with an example embodiment; and FIG. 12, which is defined by FIGS. 12A and 12B, illustrates another way of providing haptic and/or audible feedback in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring device (e.g., a pocket level) that may have an improved configuration by including an angularly adjustable bubble level. In this regard, for example, the tubular vial of the bubble level may be rotatable, but in discrete and reliable increments. In some cases, two different sets of increments may be provided with respective different scales. Moreover, the tubular vial may have a deployed position over which rotation provides for the use of the scales mentioned above, and a storage position in which the tubular vial is housed to avoid exposure to damage (e.g., during transport or storage). The device may also include a transverse hole or aperture through the housing of the device at a particular location on the housing to enable the device to be easily attached to a tether or lanyard.

Figure 1:
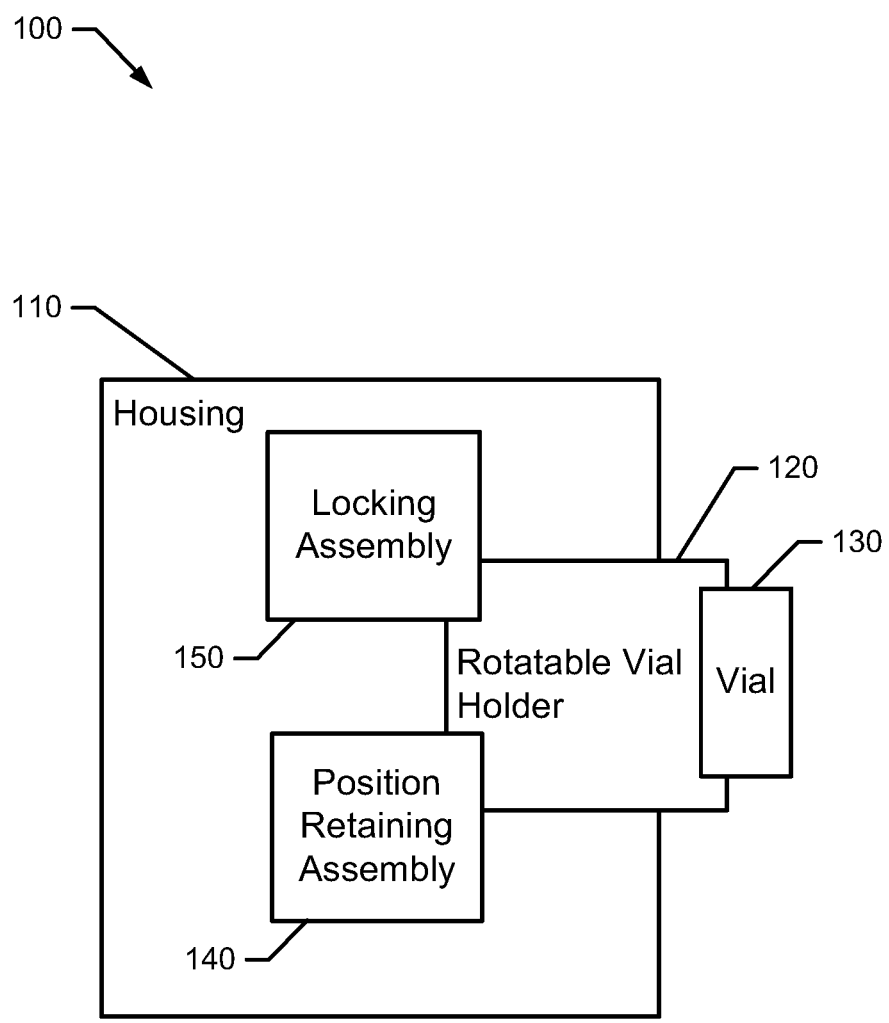
FIG. 1 illustrates a block diagram of a measuring device in accordance with an example embodiment.

FIG. 1 illustrates a block diagram of an adjustable measuring device (e.g., an adjustable level) of an example embodiment. The adjustable level 100 includes a housing 110 that is operably coupled to a rotatable vial holder 120, which holds a vial 130. The vial 130 is a tubular vial with a liquid therein. The tubular vial has a slightly elevated middle, so a bubble formed in the liquid will tend to sit in the middle of the vial 130, when the vial 130 is level.

The rotatable vial holder 120 may be movable relative to the housing 110 over a 360 degree range of motion. Moreover, the adjustable level 100 may include a position retaining assembly 140 that is configured to provide an accurate indication of angle segments ranging from 0 and 90 degrees between the orientation of the vial 130 and the housing 110, and retain the vial 130 at each respective angle segment. In this regard, for example, the position retaining assembly 140 may include a number of increments (i.e., fixed angular measurement increments) at which the vial 130 can be oriented relative to the housing 110 via operation of the rotatable vial holder 120. The position retaining assembly 140 may also include, for each respective one of the increments, the ability to provide haptic feedback or otherwise indicate that the respective one of the increments has been achieved. In some cases, a small amount of resistance may be encountered when leaving each increment and the resistance may be relieved when the next increment is achieved.

In an example embodiment, the adjustable level 100 may also include a locking assembly 150. In some cases, the locking assembly 150 may be biased to a locked state in which rotation of the rotatable vial holder 120 relative to the housing 110 is prevented (or resisted). The locking assembly 150 may also have an unlocked state in which the rotation of the rotatable vial holder 120 relative to the housing 110 is enabled (subject to the resistance or haptic feedback discussed above that may be provided by the position retaining assembly 140).

In some examples, the position retaining assembly 140 may not only include one scale for providing the accurate indication of angle segments ranging from 0 and 90 degrees between the orientation of the vial 130 and the housing 110, but may include two such scales. In this regard, one scale may extend clockwise from a reference position, and the other scale may extend counterclockwise from the reference position. Thus, the rotatable vial holder 120 (and consequently also the vial 130) may be rotated relative to the housing 110 in either clockwise or counterclockwise directions from the reference point by 90 degrees to define 180 degrees of segmented angle readings that can be achieved (e.g., when the locking assembly 150 is in the unlocked state). Moreover, in some cases, the two scales may have different increments. For example, in one direction, the increments may be defined evenly over the entire 90 degree scale every 2 degrees, 5 degrees, and/or 10 degrees, etc. Meanwhile in the other direction, a different scale that may have even or uneven increments may be defined (see FIG. 3, for example).

Although not required, in some cases, the rotatable vial holder 120 may be further rotated (e.g., 180 degrees from the reference position) to order to fully enclose the vial 130 within the housing 110. In such position, the vial 130 may be protected from damage due to impact from other tools or objects, either during transport or when the adjustable level 100 is tossed into a tool box, or other tools are tossed in and contact the adjustable level 100.

Figure 2:
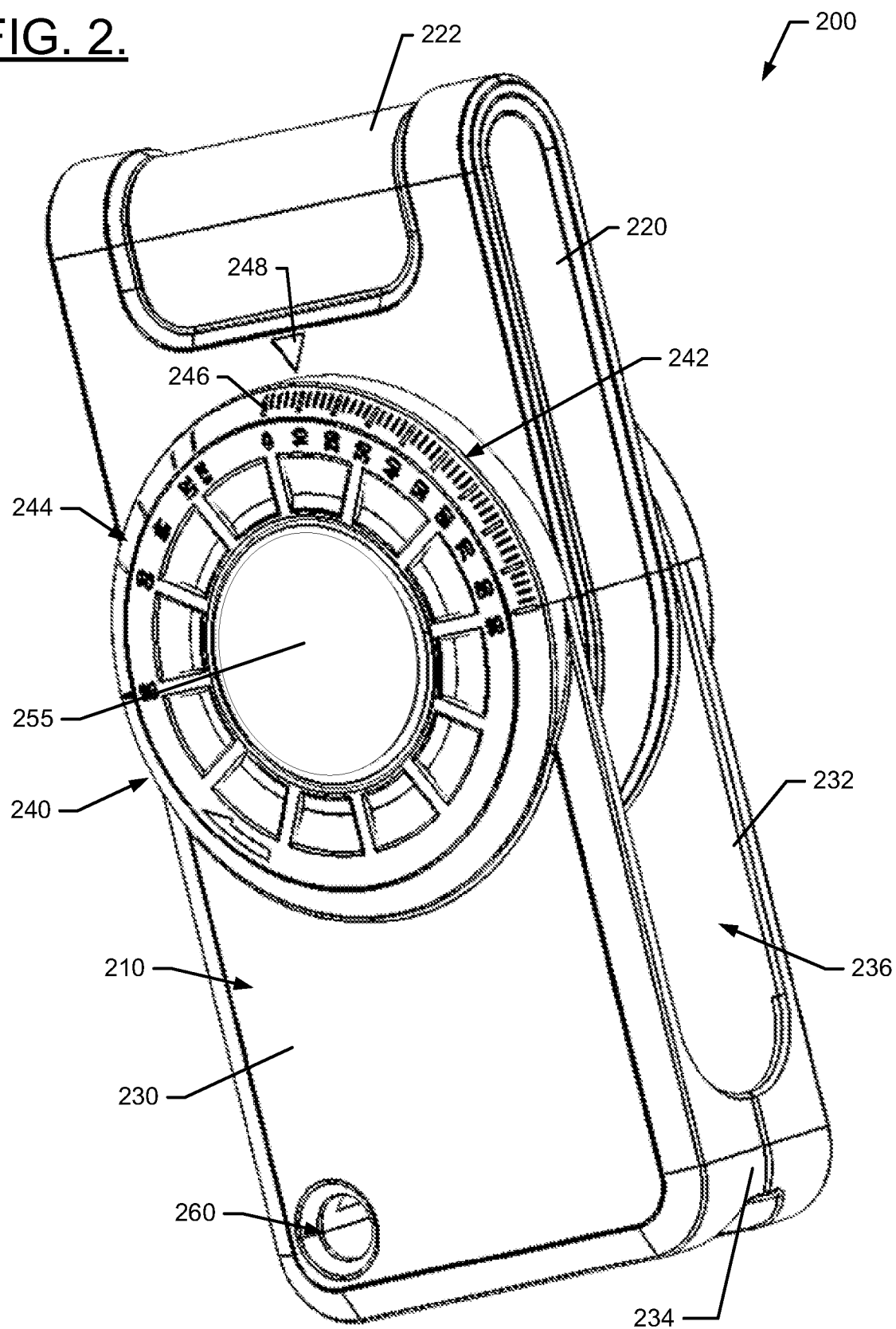
FIG. 2 shows a perspective view of an adjustable pocket level in a deployed position in accordance with an example embodiment.
Figure 3:
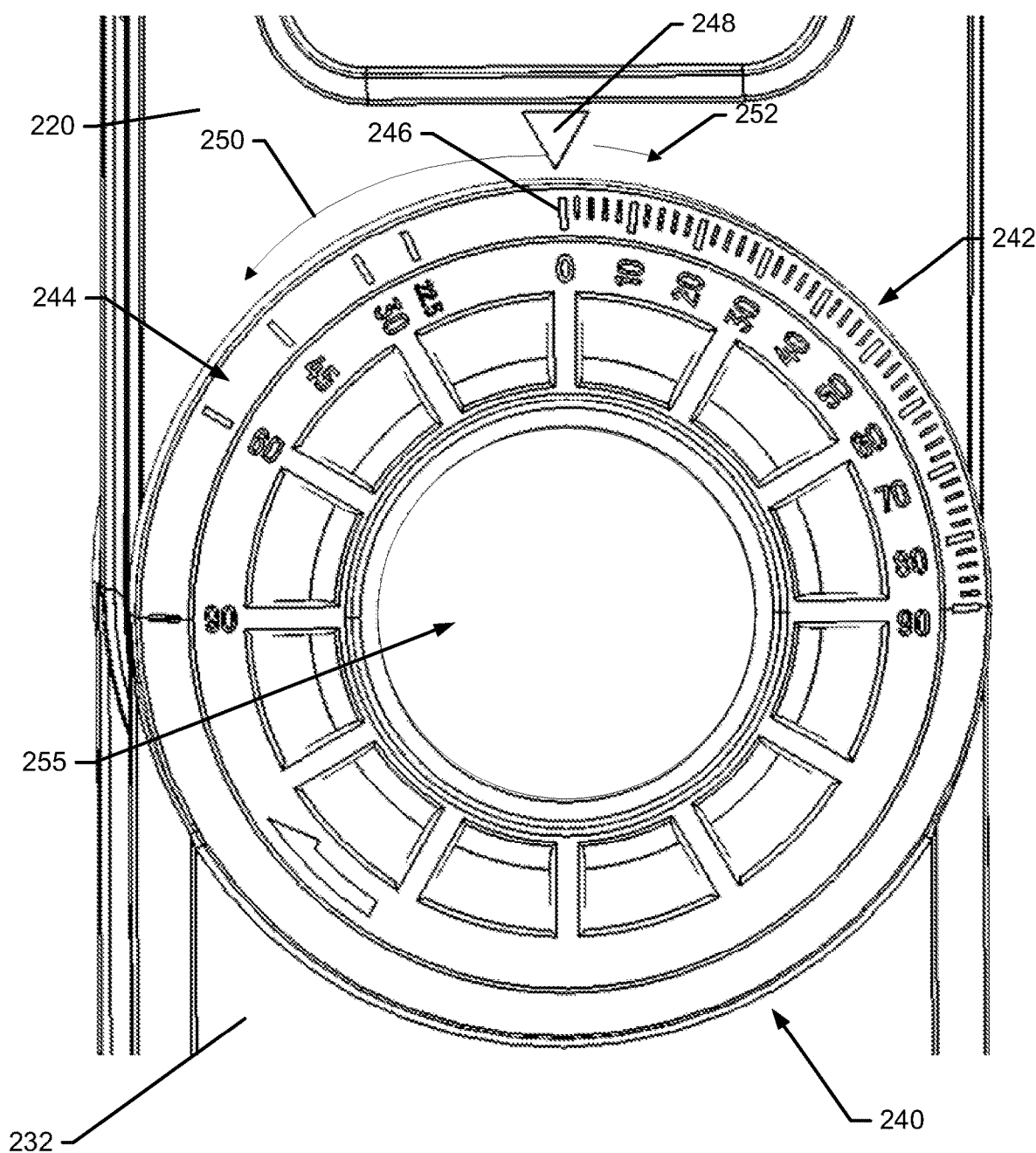
FIG. 3 illustrates a front view of an interface portion of the adjustable pocket level in accordance with an example embodiment.
Figure 4:
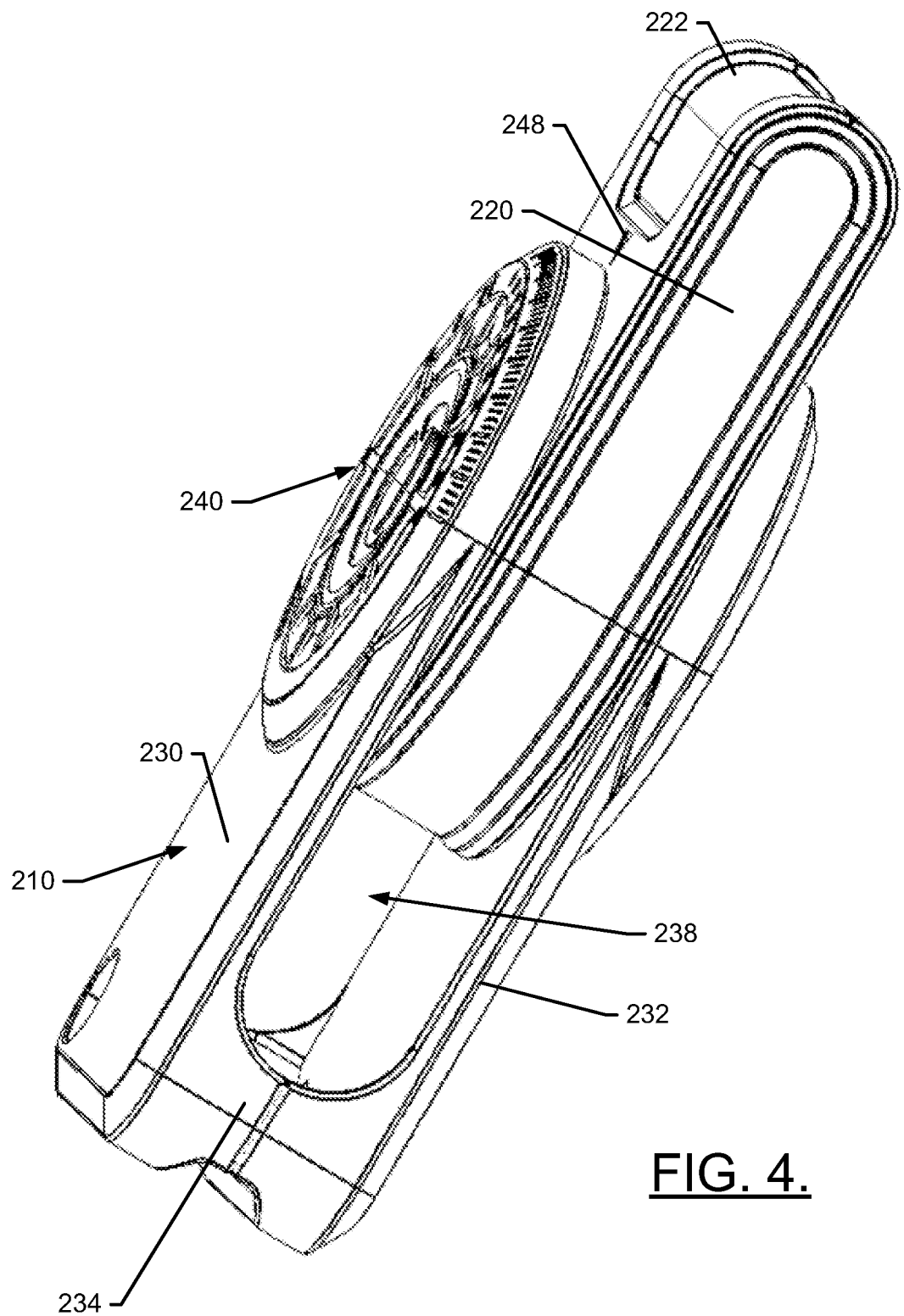
FIG. 4 illustrates a side view of the adjustable pocket level in the deployed position to show a receiving space for protecting the vial in accordance with an example embodiment.
Figure 5:
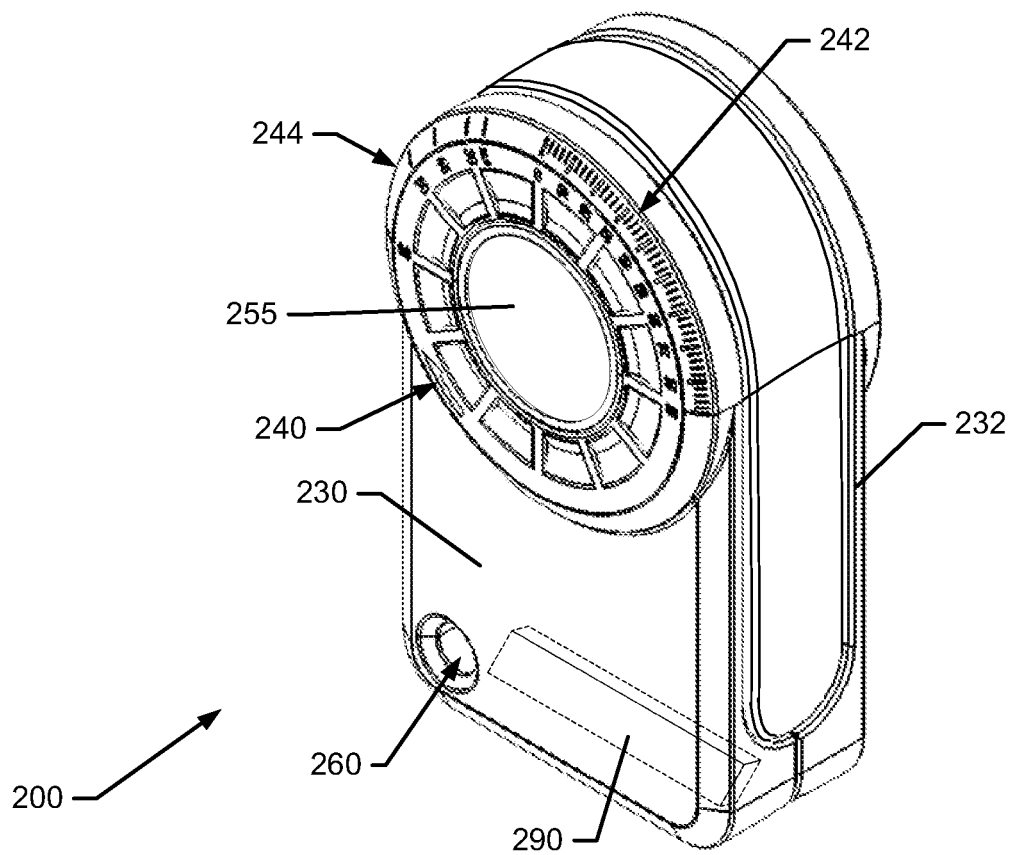
FIG. 5 shows the adjustable pocket level in a storage position in accordance with an example embodiment.
Figure 6:
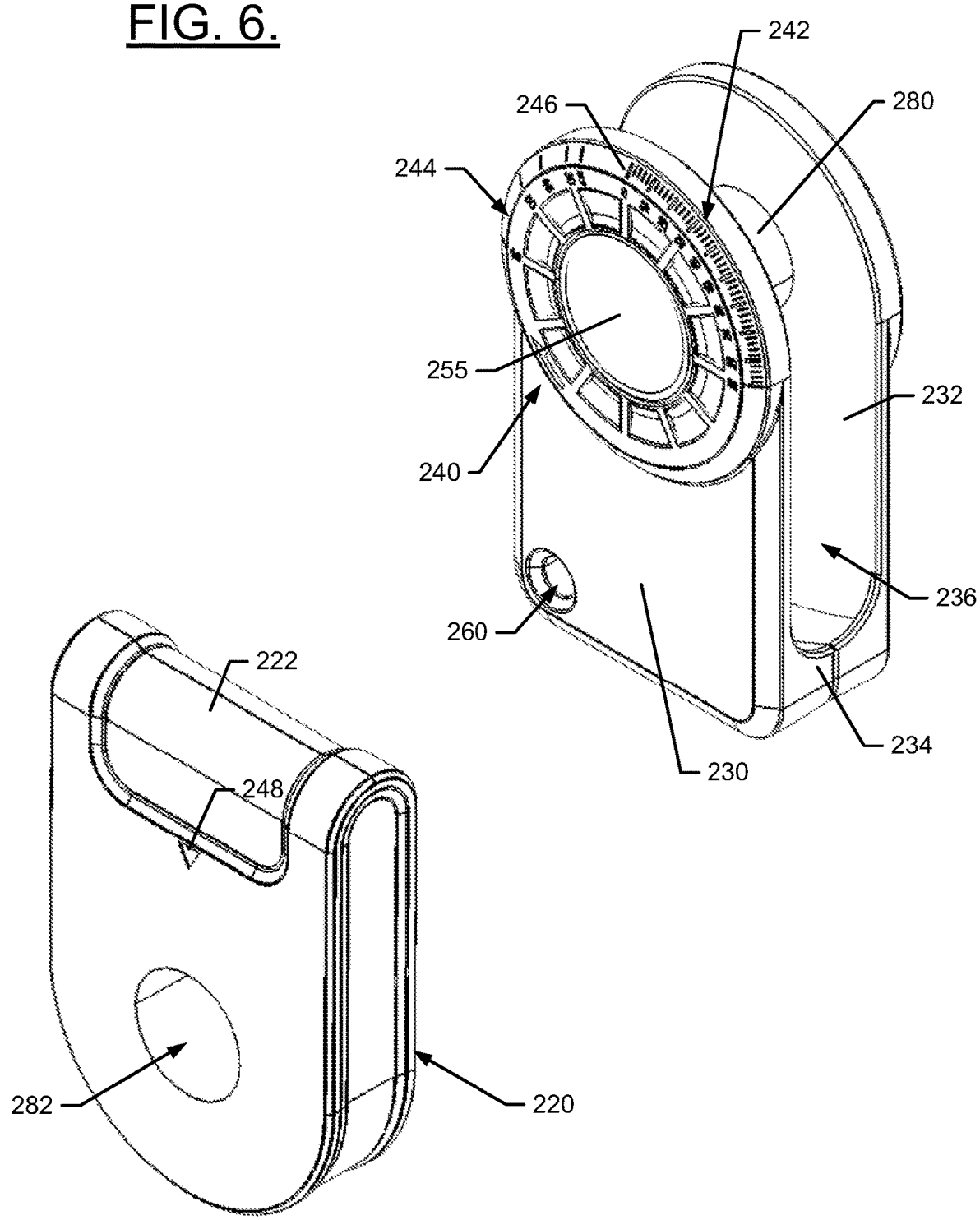
FIG. 6 is an exploded view of some components of the adjustable pocket level in accordance with an example embodiment.
Figure 7:
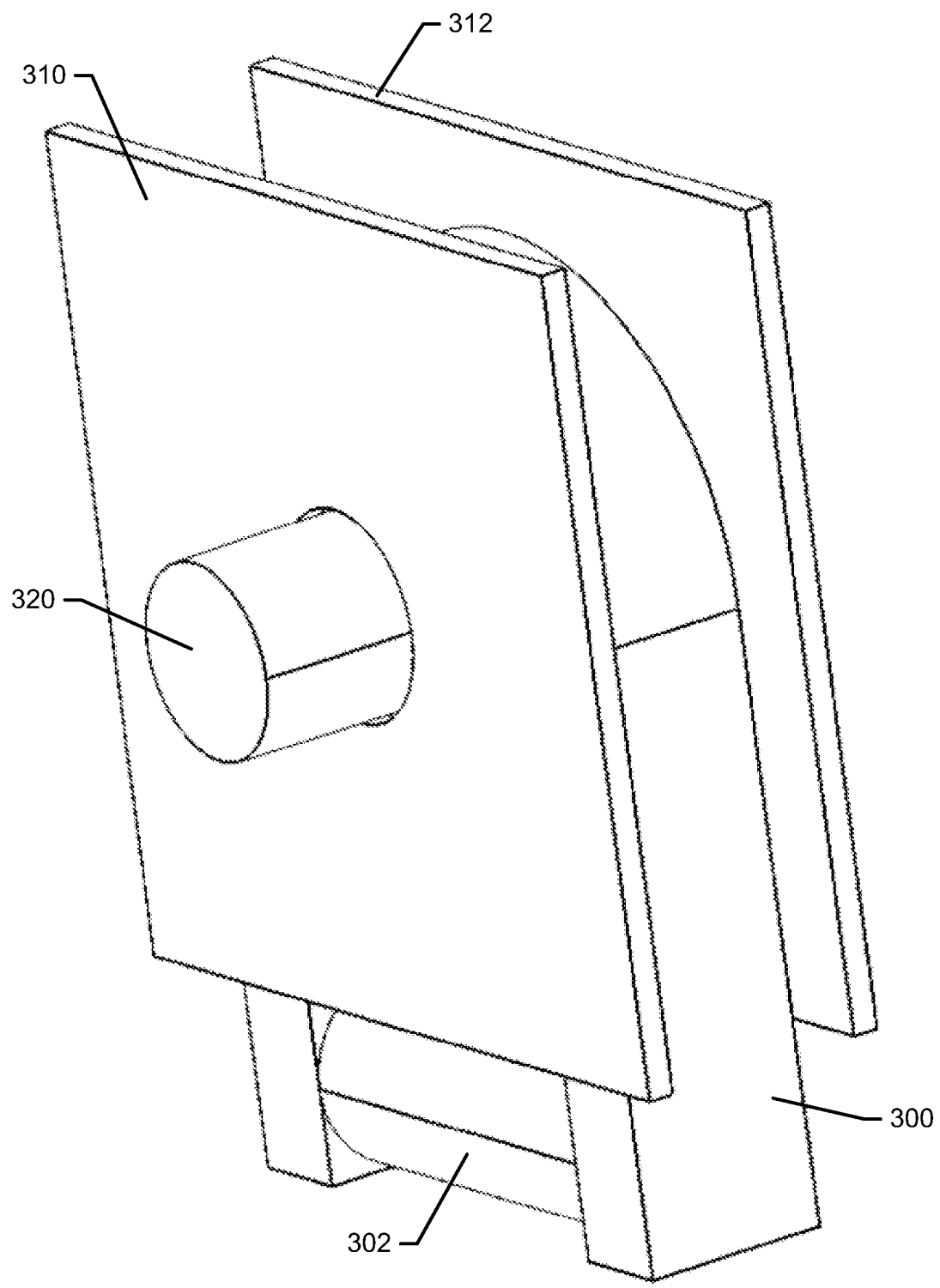
FIG. 7 illustrates a perspective view of portions of a measuring device in accordance with another example embodiment.
Figure 8:
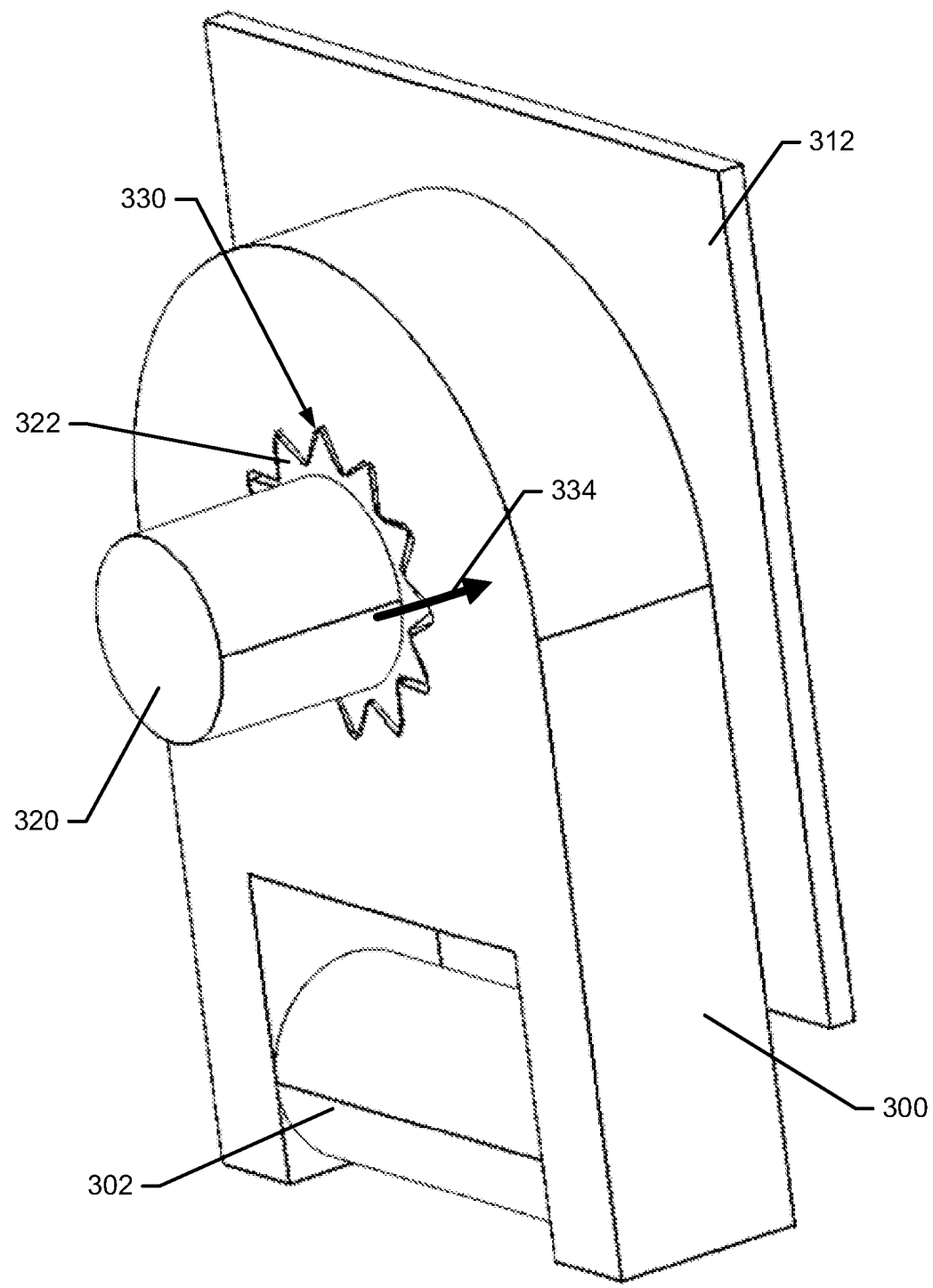
FIG. 8 illustrates the measuring device of FIG. 7 with a front wall of the housing removed in accordance with an example embodiment.
Figure 9:
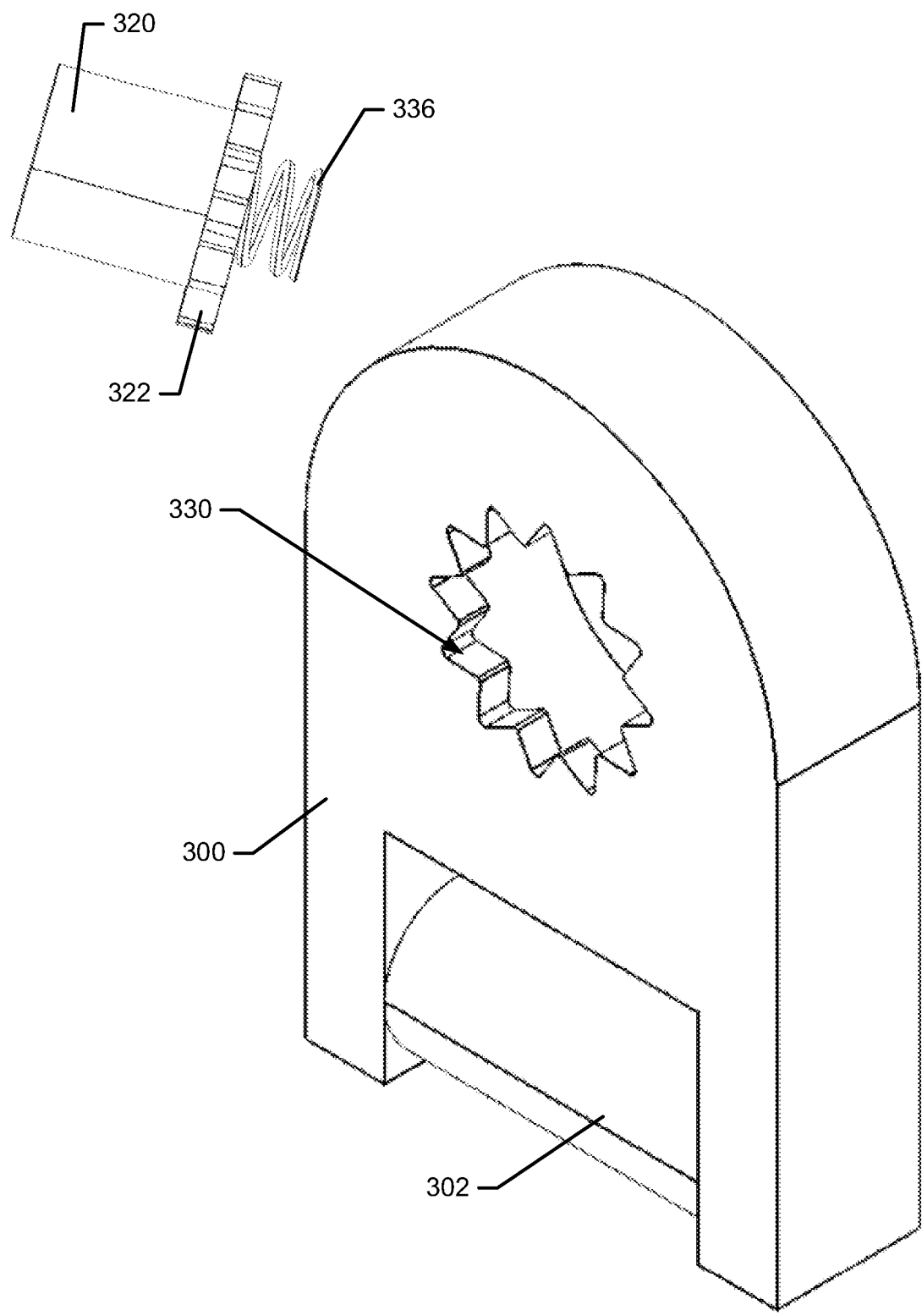
FIG. 9 illustrates a perspective view of a button of a locking assembly removed from interaction with a rotatable vial holder in accordance with an example embodiment.

FIGS. 2-6 illustrate various views of one example structure that may be employed in order to define an adjustable pocket level 200 that is an example of the adjustable level 100 of FIG. 1. In this regard, FIG. 2 shows a perspective view of the adjustable pocket level 200 in a deployed position in accordance with an example embodiment. FIG. 3 illustrates a front view of an interface portion of the adjustable pocket level 200 in accordance with an example embodiment. FIG. 4 illustrates a side view of the adjustable pocket level 200 in the deployed position to show a receiving space for protecting the vial in accordance with an example embodiment. FIG. 5 shows the adjustable pocket level 200 in a storage position in accordance with an example embodiment. Meanwhile, FIG. 6 is an exploded view of some components of the adjustable pocket level 200 in accordance with an example embodiment.

Referring now to FIGS. 2-6, the adjustable pocket level 200 may include housing 210 and rotatable vial holder 220, which may include a vial 222 affixed therein. As noted above, the rotatable vial holder 220 may be rotatable 220 relative to the housing 210 in order to define different orientations for the vial 222, each at defined angles, as discussed above, and in greater detail below.

The housing 210 may include a front wall (or face) 230 and a rear wall (or face) 232, spaced apart from each other by a base portion 234. The front wall 230 and the rear wall 232 may be substantially parallel to each other, and may define a receiving space 236 therebetween. In this example, the receiving space 236 may have a U-shaped cross section for a plane passing through the front and rear walls 230 and 232 substantially perpendicular thereto in order to receive the rotatable vial holder 220 (and vial 222) therein when rotated to the storage position shown in FIG. 5.

The adjustable pocket level 200 may also include an interface portion 240, which may be a portion of (or include components of) one or both of the position retaining assembly 140 and the locking assembly 150 of FIG. 1. In this regard, for example, the interface portion 240 may define a first scale 242 and a second scale 244. The first scale 242 of this example extends from 0 to 90 degrees clockwise from reference position (i.e., zero angle) 246. The second scale 244 of this example extends from 0 to 90 degrees counterclockwise from the reference position 246. The first and second scales 242 and 244, and the reference position 246 are fixed about an arc disposed on the front wall 230 at a distal edge thereof (relative to the base portion 234), and the reference position 246 is at an apex of the arc.

As can be appreciated from FIGS. 2 and 3, the first scale 242 is in increments of 2 degrees from 0 to 90. Each 2 degree increment may be understood to be a selectable (preset or predetermined) position at which the rotatable vial holder 220 can be both rotated and retained relative to the housing 210. Meanwhile, the increments for the second scale 244 are different. In this regard, the second scale 244 has only 5 preset positions at which the rotatable vial holder 220 can be both rotated and retained relative to the housing 210 (e.g., 22.5 degrees, 30 degrees, 45 degrees, 60 degrees, and 90 degrees). Thus, the second scale 244 has some of the more common measurements that are typically encountered specifically marked and available for rapid selection. Meanwhile, the first scale 242 has many more possible positions, but therefore requires some additional precision and attention on behalf of the user to select the desired position. The desired position (in either case) is selected by rotating the rotatable vial holder 220 relative to the housing 210 until a selection marker 248 disposed on the rotatable vial holder 220 points to the desired angle between the vial 222 and the housing 210.

In the example of FIG. 3, the selection marker 248 currently points to 0 degrees, and when the base portion 234 rests flatly on a level surface, the bubble in the vial 222 should be centered in the vial 222 to demonstrate a level condition. Meanwhile, to adjust a surface 45 degrees from level, the selection marker 248 could be rotated in the amount shown by arrow 250 to line up with the 45 degree marking on the second scale 244. The bubble in the vial 222 could be held at the center of the vial 222, and the surface may be moved to be parallel with the base portion 234. Alternatively, to measure the angle of a surface, the base portion 234 may be placed on the surface, and then the selection marker 248 could be rotated (e.g., in the direction of arrow 252) until the bubble in the vial 222 is centered therein. The value to which the selection marker 248 points on the first scale 242 defines the angle of the surface relative to a level surface. In some cases, a magnetic rod 290 or other magnetic member may be extended inside (or on a bottom surface of) the base portion 234 in order to facilitate holding the base portion 234 in place relative to a ferrous or magnetic surface as shown in FIG. 5.

In some examples, the locking assembly 150 may be configured to prevent rotation of the rotatable vial holder 220 relative to the housing 210. In this regard, the locking assembly 150 may include components not visible in FIGS. 2-6, which are configured to prevent rotation of the rotatable vial holder 220 relative to the housing 210 when in the locked state, and permit rotation of the rotatable vial holder 220 relative to the housing 210 when in the unlocked state. Another component of the interface portion 240 (which may also be part of the locking assembly 150) may be actuator 255. The actuator 255 in this example is a button that may be depressed inwardly along the axis of rotation of the rotatable vial holder 220. When the actuator 255 is being depressed, the locking assembly 150 may be in the unlocked state. However, at all other times, the locking assembly 150 may be in the locked state. In some cases, the actuator 255 may therefore be biased against depression so that the actuator 255 is biased to place the locking assembly 150 in the locked state. Details regarding operation of the locking assembly 150 will be further described in reference to FIGS. 7-11 below.

In accordance with some example embodiments, the ability to hang the adjustable pocket level 200 for storage or transport may be desirable. Accordingly, it may be desirable to provide a transverse aperture 260 through a portion of the housing 210. A tether, lanyard or other retaining element may then be passed through the transverse aperture 260. The transverse aperture 260 may be a through hole that extends from the front wall 230 to the rear wall 232 of the housing 210. However, the transverse aperture 260 may be advantageously located to permit continued and unobstructed operation of the adjustable pocket level 200 (i.e., via rotation of the rotatable vial holder 220).

In this regard, the transverse aperture 260 may be located in a corner portion of the housing 210, to pass through the base portion 234 only (i.e., not through the receiving space 236, or any portion thereof). Accordingly, the full range of rotational motion of the rotatable vial holder 220 may be achieved even when a lanyard, tether or the like is passed through the transverse aperture 260.

As noted above, the position retaining assembly 140 may be configured to provide, for each respective one of the increments of each of the first scale 242 and the second scale 244, positioning feedback (e.g., haptic feedback) to indicate that a given increment has been achieved or reached. This positioning feedback may be provided as a small amount of resistance that is encountered when leaving each increment and until the next increment is reached. As shown in FIG. 6, the housing 210 may include an axial assembly 280 that defines an axis of rotation about which a hub portion 282 of the rotatable vial holder 220 rotates when not locked. Inside faces of the front wall 230 and/or the rear wall 232 may include corresponding structures (e.g., protrusions and recesses) that match each respective segment and provide the haptic feedback. Moreover, in some cases, these structures may be located radially spaced apart from (but otherwise proximate to) the axial assembly 280 and/or the hub portion 282.

FIGS. 7-11 illustrate concept views of portions of the locking assembly 150. In this regard, a rotatable vial holder 300 (which is another example of the rotatable vial holder 120 of FIG. 1) is shown holding a vial 302. A front wall 310 (which corresponds to the front wall 230 of the example described in FIGS. 2-6) and rear wall 312 (which corresponds to the rear wall 232) may extend along front and rear sides of the rotatable vial holder 300, respectively. Button 320 is an example of the actuator 255 described above, and the button 320 may pass through an opening in the front wall 310 to interface with the rotatable vial holder 300.

In this regard, the rotatable vial holder 300 may include a retaining collar 330 (e.g., a star shaped cutout pattern) that interfaces with a corresponding patterned neck 332 on the proximal end of the button 320. The button 320 may also be configured to move (when depressed) in an inward direction (shown by arrow 334) against the force of a spring 336 (or other biasing member). As noted above, the spring 336 biases the button 320 to an extended (i.e., not depressed) normal position.

In this example, when the button 320 is in the extended (i.e., not depressed) position, the patterned neck 332 is aligned with and contacts corresponding portions of the retaining collar 330. The button 320 may not be allowed to rotate, therefore this contact and alignment may correspondingly prevent any rotation of the rotatable vial holder 300 relative to the front and rear walls 310 and 312. However, when the button 320 is depressed (i.e., in the direction of arrow 334) to the point at which the patterned neck 332 is pushed past the retaining collar 330 (and into a space behind the retaining collar 330), the rotatable vial holder 300 may be free to rotate to the deployed position (and any angle setting desired therein) or to the storage position. Accordingly, the button 320, the patterned neck 332, the spring 336 and the retaining collar 330 of FIGS. 7-11 may form the locking assembly 150 of FIG. 1.

In some cases, the rotatable vial holder 300 may include a protrusion 350 disposed at a surface that faces either the front wall 310 or the rear wall 312. The protrusion 350 may be configured to fit into respective recesses 352 disposed at a corresponding surface of either the front wall 310 or the rear wall 312. The recesses 352 may be positioned to correspond to the segments of the first scale 242 and the second scale 244. Thus, when the rotatable vial holder 300 is rotated past each of the segments, the protrusion 350 will momentarily extend into the corresponding recess 352 and provide a click or other audible or otherwise perceptible haptic feedback. The same feedback will also be provided when the desired setting for orientation of the rotatable vial holder 300 is reached. The protrusion 350 and the recesses 352 may therefore be an example of part of the position retaining assembly 140 described above in reference to FIG. 1. However, it should be appreciated that the protrusion 350 and recesses 352 could be reversed in location (i.e., having the protrusion on either the front wall 310 or rear wall 312 and the recesses on the rotatable vial holder 300) in alternative embodiments. Also, it should be understood that other structures could be used to provide similar feedback to implement the position retaining assembly 140.

It should be appreciated that other mating methods (e.g., protrusion/recess combinations) could be used to provide haptic and/or audible feedback in accordance with an example embodiment. FIG. 12, which is defined by FIGS. 12A and 12B, shows one such example. In this regard, FIG. 12A shows an isolated (partially exploded) perspective view of a first wall 400 and a second wall 410 that may be configured to rotatably interface with each other, and FIG. 12B. shows an exploded view of each of the first and second walls 400 and 410, respectively. Thus, the space shown between the first and second walls 400 and 410 in FIG. 12A should be understood to be exaggerated in order to allow the respective walls to be visible. The first and second walls 400 and 410 may be dial faces that could be the front and rear walls 310 and 312 described above, or any other interacting surfaces of the adjustable level 100 of FIG. 1 that enable the vial to be rotated. As shown in FIG. 12, the first wall may include a protrusion 420 that is an elongated, radially extending ridge. Meanwhile, the recesses 430 on the second wall 410 are correspondingly shaped elongated, radially extending grooves. The rotation of the vial may cause the protrusion 420 to be aligned with respective different ones of the recesses 430 and audible and/or haptic feedback may be generated when each such alignment is reached.

In an example embodiment, a measuring device (e.g., a bubble level) is provided. The device may include a housing having a front wall and a rear wall operably coupled to each other via a base portion and defining a receiving space between the front wall and the rear wall, a rotatable vial holder (rotatably) disposed in the receiving space and being configured to hold a vial, and a locking assembly having a locked state in which the rotatable vial holder is prevented from rotating relative to the housing. The locking assembly is also configured to enable the rotatable vial holder to be rotated relative to the housing when the locking assembly is in an unlocked state.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the device may further include a position retaining assembly configured to define a plurality of selected angles between the base portion and the vial that correspond to segments of a first scale. The position retaining assembly may be configured to provide audible and/or haptic feedback to indicate alignment of the rotatable vial holder and the housing at each respective one of the selected angles. Alternatively or additionally, the rotatable vial holder may be rotatable to a deployed position to define a selected angle between the base portion and the vial, and the rotatable vial holder may also be rotatable to a storage position in which the vial is enclosed inside the receiving space of the housing. In an example embodiment, the position retaining assembly may be further configured to define a second plurality of selected angles between the base portion and the vial that correspond to segments of a second scale. In some cases, the first scale may correspond to rotation in a first direction from a reference position and the second scale may correspond to rotation in a second direction from the reference position. In an example embodiment, the first scale and the second scale may have different segment sizes. In some cases, segments of the first scale may be spaced apart equally from each other, and at least some of the segments of the second scale may not be equally spaced apart from each other. In an example embodiment, the position retaining assembly may include a protrusion disposed at a first surface of one of the housing or the rotatable vial holder, and a plurality of recesses disposed at a second surface of the other one of the rotatable vial holder or the housing, and the plurality of recesses may correspond to the selected angles. In an example embodiment, the housing may include a transverse aperture that extends from the front wall to the rear wall through the base portion. In some cases, the locking assembly may include a button movable axially along an axis of the rotatable vial holder to transition the locking assembly between the locked state and the unlocked state. In an example embodiment, the locking assembly may be biased to the locked state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advan- That which is claimed:

1. A measuring device comprising:
a housing having a front wall and a rear wall operably coupled to each other via a base portion and defining a receiving space between the front wall and the rear wall;
a rotatable vial holder configured to hold a vial, the rotatable vial holder being disposed in the receiving space; and
a locking assembly configured to include a locked state in which the rotatable vial holder is prevented from rotating relative to the housing, the locking assembly being configured to enable the rotatable vial holder to be rotated relative to the housing when the locking assembly is in an unlocked state,
wherein the rotatable vial holder is rotatable to a deployed position to define a selected angle between the base portion and the vial,
wherein the rotatable vial holder is rotatable to a storage position in which the vial is enclosed inside the receiving space of the housing,
wherein the measuring device further comprises a position retaining assembly configured to define a plurality of selected angles between the base portion and the vial that correspond to segments of a first scale, and
wherein the position retaining assembly is further configured to define a second plurality of selected angles between the base portion and the vial that correspond to segments of a second scale.

2. The device of claim 1,
wherein the position retaining assembly is configured to provide audible and/or haptic feedback to indicate alignment of the rotatable vial holder and the housing at each respective one of the selected angles.

3. The device of claim 2, wherein the first scale corresponds to rotation in a first direction from a reference position and the second scale corresponds to rotation in a second direction from the reference position.

4. The device of claim 3, wherein the first scale and the second scale have different segment sizes.

5. The device of claim 4, wherein segments of the first scale are spaced apart equally from each other, and
wherein at least some of the segments of the second scale are not equally spaced apart from each other.

6. The device of claim 2, wherein the position retaining assembly comprises a protrusion disposed at a first surface of one of the housing or the rotatable vial holder, and a plurality of recesses disposed at a second surface of the other one of the rotatable vial holder or the housing, and
wherein the plurality of recesses correspond to the selected angles.

7. A measuring device comprising:
a housing having a front wall and a rear wall operably coupled to each other via a base portion and defining a receiving space between the front wall and the rear wall;
a rotatable vial holder configured to hold a vial, the rotatable vial holder being disposed in the receiving space; and
a locking assembly configured to include a locked state in which the rotatable vial holder is prevented from rotating relative to the housing, the locking assembly being configured to enable the rotatable vial holder to be rotated relative to the housing when the locking assembly is in an unlocked state,
wherein the rotatable vial holder is rotatable to a deployed position to define a selected angle between the base portion and the vial,
wherein the rotatable vial holder is rotatable to a storage position in which the vial is enclosed inside the receiving space of the housing, and
wherein the housing comprises a transverse aperture that extends from the front wall to the rear wall through the base portion.

8. The device of claim 1, wherein the locking assembly comprises a button movable axially along an axis of the rotatable vial holder to transition the locking assembly between the locked state and the unlocked state.

9. The device of claim 1, wherein the locking assembly is biased to the locked state.

10. A measuring device comprising:
a housing having a front wall and a rear wall operably coupled to each other via a base portion and defining a receiving space between the front wall and the rear wall;
a rotatable vial holder configured to hold a vial, the rotatable vial holder being disposed in the receiving space;
a locking assembly having a locked state in which the rotatable vial holder is prevented from rotating relative to the housing, the locking assembly being configured to enable the rotatable vial holder to be rotated relative to the housing when the locking assembly is in an unlocked state; and
a position retaining assembly configured to define a plurality of selected angles between the base portion and the vial that correspond to segments of a first scale,
wherein the position retaining assembly is configured to provide audible and/or haptic feedback to indicate alignment of the rotatable vial holder and the housing at each respective one of the selected angles, and
wherein the position retaining assembly is further configured to define a second plurality of selected angles between the base portion and the vial that correspond to segments of a second scale.

11. The device of claim 10, wherein the first scale corresponds to rotation in a first direction from a reference position and the second scale corresponds to rotation in a second direction from the reference position.

12. The device of claim 11, wherein the first scale and the second scale have different segment sizes.

13. The device of claim 12, wherein segments of the first scale are spaced apart equally from each other, and
wherein at least some of the segments of the second scale are not equally spaced apart from each other.

14. The device of claim 10, wherein the rotatable vial holder is rotatable to a deployed position to define a selected angle between the base portion and the vial, and
wherein the rotatable vial holder is rotatable to a storage position in which the vial is enclosed inside the receiving space of the housing.

15. The device of claim 14, wherein the position retaining assembly comprises a protrusion disposed at a first surface of one of the housing or the rotatable vial holder, and a plurality of recesses disposed at a second surface of the other one of the rotatable vial holder or the housing, and
wherein the plurality of recesses correspond to the selected angles.

16. The device of claim 10, wherein the housing comprises a transverse aperture that extends from the front wall to the rear wall through the base portion.

17. The device of claim 10, wherein the locking assembly comprises a button movable axially along an axis of the rotatable vial holder to transition the locking assembly between the locked state and the unlocked state.

18. The device of claim 10, wherein the locking assembly is biased to the locked state.

* * * * *